(12) United States Patent  
Pan et al.

(10) Patent No.: US 12,116,728 B2  
(45) Date of Patent: Oct. 15, 2024

(54) ROTATING PULP SUCTION AND ROBOT TRANSFER MOLDING MACHINE AND MOLDING METHOD

(71) Applicant: SHURCON MANUFACTURING (ZHEJIANG) CO., LTD., Jiaxing (CN)

(72) Inventors: Yaohua Pan, Jiaxing (CN); Gang Cen, Jiaxing (CN); Kai Wang, Jiaxing (CN); Chao Wang, Jiaxing (CN)

(73) Assignee: SHURCON MANUFACTURING (ZHEJIANG) CO., LTD., Jiaxing (CN)

( * ) Notice: Subject to any disclaimer, the term of this patent is extended or adjusted under 35 U.S.C. 154(b) by 380 days.

(21) Appl. No.: 17/740,144

(22) Filed: May 9, 2022

(65) Prior Publication Data

US 2022/0275581 A1  Sep. 1, 2022

Related U.S. Application Data

(63) Continuation of application No. PCT/CN2020/128880, filed on Nov. 14, 2020.

(30) Foreign Application Priority Data

Dec. 10, 2019 (CN) .......................... 201911257748.9

(51) Int. Cl.
| | |
|---|---|
| *D21F 13/10* | (2006.01) |
| *B08B 3/02* | (2006.01) |
| *D21G 7/00* | (2006.01) |
| *D21G 9/00* | (2006.01) |
| *D21J 3/00* | (2006.01) |

(Continued)

(52) U.S. Cl.  
CPC ................ *D21F 13/10* (2013.01); *B08B 3/02* (2013.01); *D21G 7/00* (2013.01); *D21G 9/00* (2013.01); *D21J 3/00* (2013.01); *D21J 5/00* (2013.01); *B25J 11/00* (2013.01)

(58) Field of Classification Search  
CPC .. D21F 13/10; B08B 3/02; D21G 7/00; D21G 9/00; D21J 3/00; D21J 5/00; B24J 11/00  
See application file for complete search history.

(56) References Cited

U.S. PATENT DOCUMENTS

2017/0197334 A1* 7/2017 Kuo ...................... B29C 33/202

* cited by examiner

*Primary Examiner* — Jacob T Minskey  
*Assistant Examiner* — Stephen M Russell  
(74) *Attorney, Agent, or Firm* — Hemisphere Law, PLLC; Zhigang Ma (57) ABSTRACT

A rotating pulp suction and robot transfer molding machine includes: a frame and a pulp container located at an inner bottom of the frame. A pulp container drive mechanism is connected to the pulp container and drives the pulp container to move up and down. A pulp suction vacuum pipeline is arranged horizontally and two ends thereof are rotatably connected on the frame. A pulp suction mold is fixed on the middle of the pulp suction vacuum pipeline and connected thereto by a vacuumizing connecting structure. An extrusion mechanism downwardly engages with the pulp suction mold and extrudes pulp to prepare a wet blank of pulp product. A robot is mounted with a transfer mold and used to transfer the wet blank to outside of the frame. A high-low pressure sprinkler pipe is horizontally slidably connected with the frame and transversely arranged above the pulp suction vacuum pipeline.

12 Claims, 8 Drawing Sheets

(51) Int. Cl.
*D21J 5/00* (2006.01)
*B25J 11/00* (2006.01)

ROTATING PULP SUCTION AND ROBOT TRANSFER MOLDING MACHINE AND MOLDING METHOD

CROSS-REFERENCE TO RELATED APPLICATIONS

This application is a continuation of International Application No. PCT/CN2020/128880, filed on Nov. 14, 2020. The International Application claims a priority to a Chinese patent application No. 201911257748.9 filed to the China National Intellectual Property Administration on Dec. 10, 2019. The entire contents of the above-mentioned applications are hereby incorporated by reference in their entireties.

TECHNICAL FIELD

The present disclosure relates to the field of paper and plastic products machinery, in particular to a rotating pulp suction and robot transfer molding machine and a molding method.

BACKGROUND

Pulp molded products have very good environmental performance.

The pulp molded products include containers, plates and so on. The containers include coffee cups and so on.

Processing steps of the pulp molded product are as follows:

A pulp suction mold sucks pulp from a pulp container, and after sucking the pulp, it is transferred to below an extrusion mold through a transfer mold; and there is a lower extrusion mold below the extrusion mold, which is used to undertake and finally carry out extrusion processing. Alternatively, a turnover shaft is used to turn over the pulp suction mold after sucking the pulp to below an extrusion molding mold for extrusion processing.

The first method realizes the product transfer molding by configuring a guide rail mechanism, and the molding equipment has a high preparation cost and poor flexibility. The second method needs to further improve finished product quality of the final pulp product, resulting from there is no cleaning step after sucking the pulp.

SUMMARY

Objectives of the present disclosure are to provide a rotating pulp suction and robot transfer molding machine and a molding method that can solve the above-mentioned technical problems.

In order to achieve the objectives, the present disclosure proposes a technical solution as follows.

Specifically, a rotating pulp suction and robot transfer molding machine may include:
a frame;
a pulp container, wherein an upper end of the pulp container is defined with an opening, and the pulp container is arranged at an inner bottom of the frame;
a pulp container drive mechanism, wherein the pulp container and the frame are vertically slidably connected, and the pulp container drive mechanism is connected to the pulp container and configured to drive pulp container to move up and down in a vertical direction;
a pulp suction vacuum pipeline, arranged horizontally, wherein two ends of the pulp suction vacuum pipeline are rotatably connected to the frame, and the pulp suction vacuum pipeline is located above the opening of the pulp container and connected to a rotation drive mechanism;
a pulp suction mold, fixed on a middle of the pulp suction vacuum pipeline, wherein the pulp suction vacuum pipeline and the pulp suction mold are connected through a vacuumizing connecting structure, and the pulp suction mold is configured to, after the pulp container is lifted up to a setting position, enter into the pulp container to suck pulp under a rotation of the pulp suction vacuum pipeline and leave the pulp container along with the rotation of the pulp suction vacuum pipeline;
an extrusion mechanism, arranged above the pulp suction vacuum pipeline and configured to, when the pulp suction mold after leaving the pulp container is rotated to just below the extrusion mechanism, downwardly engage with the pulp suction mold and extrude the pulp on the pulp suction mold to prepare a wet blank of pulp product;
a high-low pressure sprinkler pipe, horizontally slidably connected to the frame in a front-rear direction and transversely arranged above the pulp suction vacuum pipeline, wherein high-pressure nozzles and low-pressure nozzles with downward outlets are disposed on the high-low pressure sprinkler pipe, the high-low pressure sprinkler pipe is connected to a sprinkler pipe drive mechanism; the high-low pressure sprinkler pipe is configured to, under a driving of the sprinkler pipe drive mechanism, move above the pulp suction mold and perform low-pressure sprinkling cleaning to the pulp by the low-pressure nozzles; and the high-low pressure sprinkler pipe is configured to, after the wet blank of pulp product is transferred through a transfer mold, move above the pulp suction mold and perform high-pressure sprinkling cleaning on the pulp suction mold through the high-pressure nozzles.

In an embodiment, the pulp suction mold is 1-8 in quantity; and when the quantity of the pulp suction mold is at least two, one of the at least two pulp suction molds enters into the pulp container to suck the pulp, while the other one of the at least two pulp suction molds is engaged with the extrusion mechanism.

In an embodiment, cantilever plates are respectively disposed on front and rear sides of the opening of the pulp container, two ends of each of the cantilever plates are respectively disposed with guide post penetration holes, guide post sleeves are connected at lower openings of the guide post penetration holes, upper fixing beams are disposed on the frame and respectively located above the cantilever plates, lower fixing beams are disposed on the frame and respectively located below the cantilever plates, the upper fixing beam and the lower fixing beam located at a front side of the frame are arranged mutually parallel up and down, the upper fixing beam and the lower fixing beam located at a rear side of the frame are arranged mutually parallel up and down, guide posts are respectively inserted in the guide post sleeves, upper ends of the guide posts penetrate through the respective guide post penetration holes upwards, the upper end of the guide post penetrating through the cantilever plate on a front side of the pulp container is fixed on the upper fixing beam at the front side of the frame, a lower end of the guide post penetrating through the cantilever plate on the front side of the pulp container is fixed on the lower fixing beam at the front side of the frame, the upper end of the guide post penetrating through the cantilever plate on a rear side of the pulp container is fixed on the upper fixing beam at the rear side of the frame, a lower end of the guide post penetrating through the cantilever plate on the rear side of the pulp container is fixed on the lower fixing beam at the rear side of the frame.

In an embodiment, the pulp container drive mechanism includes a front driving mechanism and a rear driving mechanism; the front driving mechanism is arranged between two of the guide posts located at the front side of the frame, the rear driving mechanism is arranged between two of the guide posts located at the rear side of the frame, a structure of the front driving mechanism is the same as that of the rear driving mechanism and comprises a fixing base plate and a pulp container driver; a part of the fixing base plate is fixed on a bottom beam of the frame, and the other part of the fixing base plate is fixed on the lower fixing beam; the pulp container driver is mounted on an upper surface of the fixing base plate, and the pulp container drive is one of a pneumatic cylinder, an oil cylinder and a servo motor; and the pulp container driver is connected to the cantilever plate.

In an embodiment, the pulp suction vacuum pipeline is U-shaped and transversely arranged above the opening of the pulp container, two ends of a middle straight section of the pulp suction vacuum pipeline are respectively sleeved with turnover seats rotatably connected to the pulp suction vacuum pipeline, the turnover seats are fixed on the frame, the pulp suction vacuum pipeline and each of the turnover seats have a bearing or a shaft sleeve arranged therebetween.

In an embodiment, the rotation drive mechanism includes driven gears, driving gears, and servo motors; the driven gears are respectively sleeved on the two ends of the middle straight section of the pulp suction vacuum pipeline, and each of the driven gears is located an outer side of a corresponding one of the turnover seats; the driving gears are disposed on the frame and meshed with the driven gears in one-to-one manner, and the servo motors are configured to respectively drive the driving gears to rotate.

In an embodiment, the pulp suction mold is two in quantity, and the two pulp suction molds are symmetrically distributed about an axial line of the pulp suction vacuum pipeline; the vacuumizing connecting structure comprises partition plates and an intermediate partition; the partition plates are respectively arranged at two inner ends of the middle straight section of the pulp suction vacuum pipeline, the partition plates are respectively defined with connecting holes and the connecting holes are staggeredly distributed, two ends of the intermediate partition are respectively connected to opposing inner surfaces of the partition plates, the partition plates and the intermediate partition together divide an interior of the pulp suction vacuum pipeline into two independent cavities, one end of the pulp suction vacuum pipeline is connected with one of the cavities, the other end of the pulp suction vacuum pipeline is connected with the other one of the cavities, each the pulp suction mold is connected with a corresponding one of the cavities through a plurality of connecting ducts, each of the connecting ducts is a rigid pipe, one end of the connecting duct is connected to the pulp suction mold and the other end of the connecting duct is connected onto the pulp suction vacuum pipeline, and an angle limit mechanism is disposed between the frame and any one of the ends of the middle straight section of the pulp suction vacuum pipeline and configured to limit a rotation angle of the pulp suction vacuum pipeline.

In an embodiment, a surface of each of the two pulp suction molds close to the connecting ducts is disposed with a reinforcing plate, and the reinforcing plate is defined with through holes allowing the connecting ducts to pass therethrough; the two reinforcing plates respectively corresponding to the two pulp suction molds are mutually parallel, and opposing sides of the two reinforcing plates are connected with side reinforcement plates; and the reinforcing plate and corresponding ones of the side reinforcement plates together form a rectangular structure.

In an embodiment, the extrusion mechanism includes a fixing plate fixed at a top of the frame, an extrusion mold is connected to a lower surface of the fixing plate and vertically slidably connected with the fixing plate, an extrusion lifting drive device is disposed on the fixing plate and connected to the extrusion mold, a heating structure is disposed in the extrusion mold, and the extrusion mold is configured to, under a driving of the extrusion lifting drive device, move downwardly close to the pulp suction mold rotated to just below of the extrusion mold.

In an embodiment, the sprinkler pipe drive mechanism includes vertical plates are respectively connected to two ends of the high-low pressure sprinkler pipe, upper ends of the respective vertical plates are connected to sliders respectively, the sliders are respectively slidably connected with guide rails fixed at a top of the frame, the guide rails are mutually parallel, pulley belts are disposed on the frame and around outsides of the guide rails respectively, each of the pulley belts is wound around two pulleys, an upper end of each of the vertical plates is connected to the pulley belt through a clamping structure, two ends of each of the guide rails are respectively disposed with the pulleys, one the pulley which one of the pulley belts is wound around is connected to one the pulley which the other one of the pulley belts is wound around through a linkage shaft, and the linkage shaft is connected to a servo driving motor through a chain transmission structure.

In an embodiment, the rotating pulp suction and robot transfer molding machine further includes a robot; wherein a transfer mold is mounted on the robot, and the robot is configured to drive the transfer mold to take the wet blank of pulp product and transfer the taken wet blank of pulp product to outside of the frame.

A rotating pulp suction molding method for pulp products, using the molding machine, is provided. The molding method may include:

S1, mixing pulp materials to obtain pulp, injecting the pulp into the pulp container, and evenly stirring and mixing;

S2, lifting up the pulp container to a setting position, rotating the pulp suction vacuum pipeline to drive one the pulp suction mold to immerse into the pulp in the pulp container, connecting the pulp suction vacuum pipeline to a vacuum pump and vacuumizing, at this time the pulp in the pulp container being sucked onto the pulp suction mold due to the pulp suction mold is vacuumized, maintaining at a vacuum state and rotating the pulp suction vacuum pipeline to rotate the pulp suction mold sucked with the pulp to just below the extrusion mechanism, and at least one other pulp suction mold being immersed into the pulp container to suck the pulp;

S3, performing low-pressure cleaning, by the low-pressure nozzles, to the pulp sucked on the pulp suction mold;

S4, simultaneously dropping the extrusion mechanism downwardly to engage with the pulp suction mold for extrusion to prepare a wet blank of pulp product while the at least one other pulp suction mold sucking the pulp;

S5, pre-drying the wet blank of pulp product by heating through the extrusion mechanism;

S6, driving a transfer mold to take the pre-dried wet blank of pulp product and transferring the taken pre-dried wet blank of pulp product to outside of the frame, by a robot; and S7, performing high-pressure cleaning on the pulp suction mold by the high-pressure nozzles, and repeating the steps S1~S7 for the cleaned pulp suction mold.

Compared with the related art, the rotating pulp suction and robot transfer molding machine according to the present disclosure may have advantages as that: having a simple structure, more versatile product production capacity, and reduced equipment manufacturing costs.

By using low-pressure nozzles to carry out low-pressure sprinkling cleaning to pulp and using high-pressure nozzles to carry out high-pressure sprinkling cleaning on the pulp suction mold, it can improve product quality as well as reduce the frequency of mold maintenance.

The cooperation of the robot with the transfer mold can make the equipment more flexible and convenient to use.

DETAILED DESCRIPTION OF EMBODIMENTS

The following is to further describe technical solutions of the present invention through specific embodiments in combination with the accompanying drawings, but the present disclosure is not limited to these embodiments.

Figure 4:
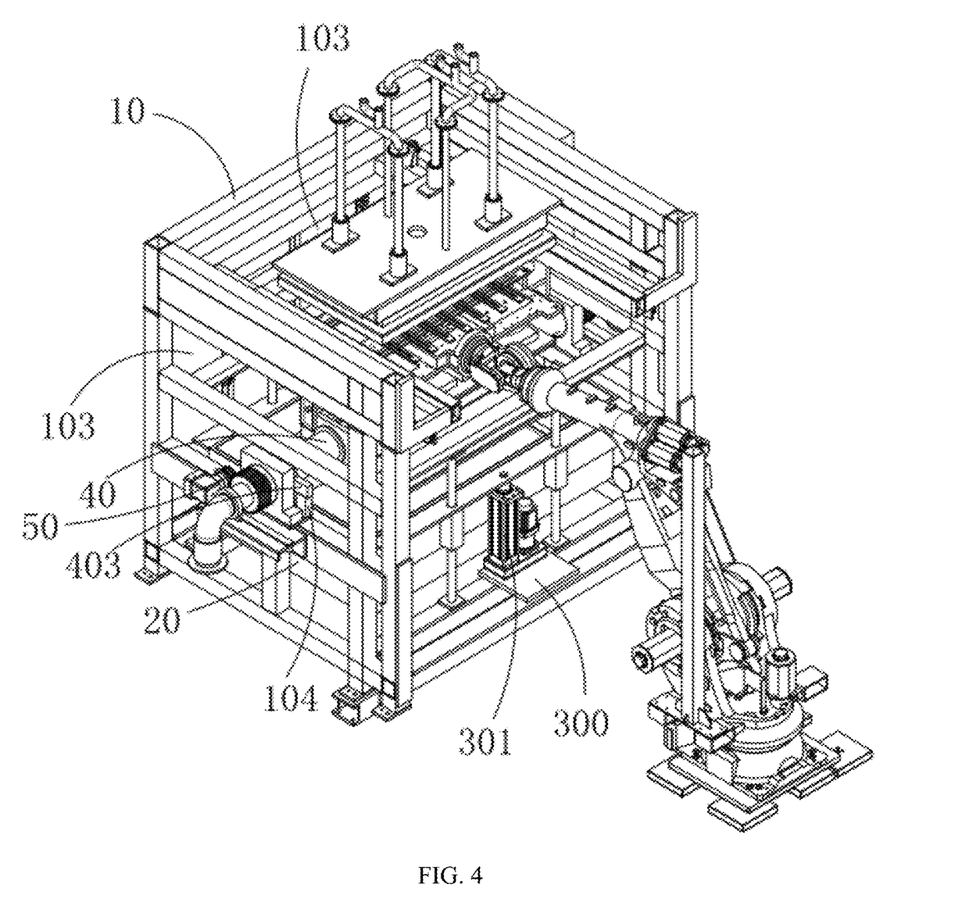
FIG. 4 illustrates another schematic perspective structural view of the rotating pulp suction and robot transfer molding machine according to the present disclosure.

As illustrated in FIG. 4, a rotating pulp suction and robot transfer molding machine includes a frame 10. The frame is a frame structure made of square steel pipe material by welding, and the rear side of the frame 10 is connected with two protective doors 103 which are symmetrically distributed, and each of the protective doors 103 is hinged on the frame 10 through a hinge.

The protective doors can play a protective role, to ensure production safety.

Figure 1:
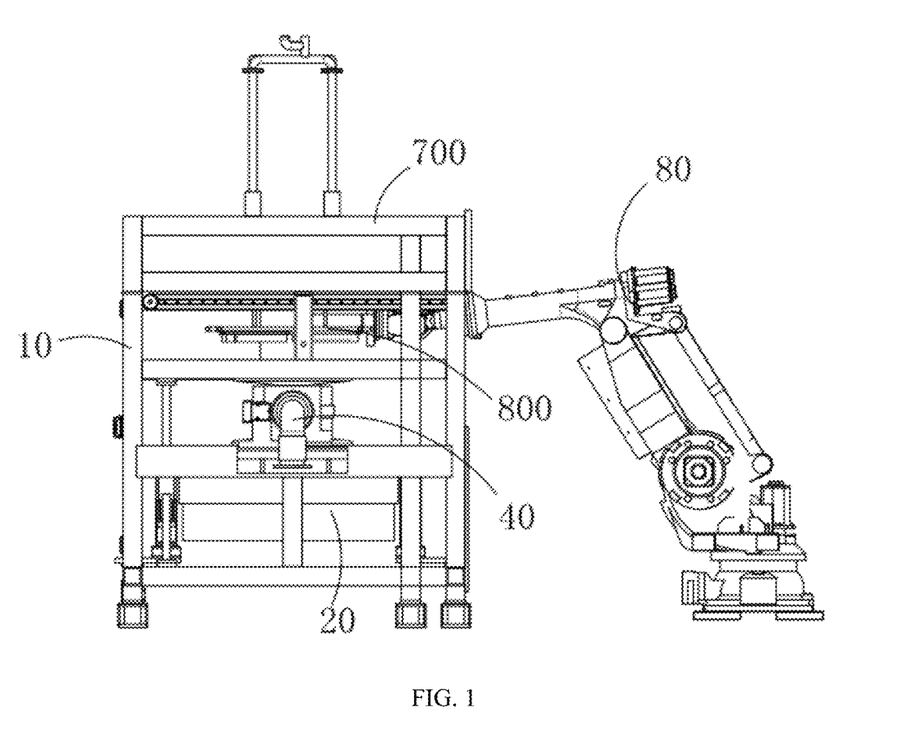
FIG. 1 illustrates a schematic structural side view of a rotating pulp suction and robot transfer molding machine according to the present disclosure.
Figure 8:
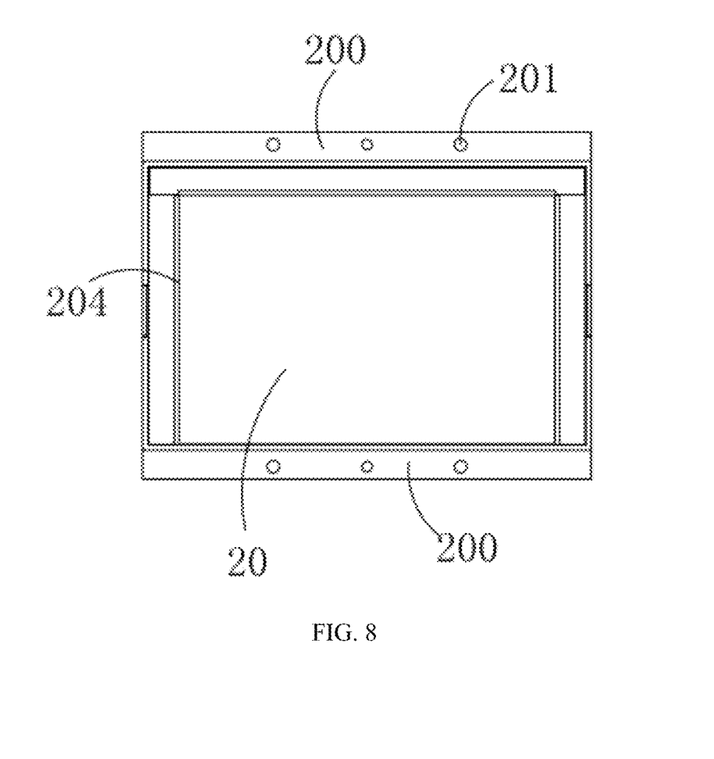
FIG. 8 illustrates a schematic structural view of a pulp container of the rotating pulp suction and robot transfer molding machine according to the present disclosure.

As illustrated in FIG. 1 and FIG. 8, a pulp container 20 is provided. An upper end of the pulp container 20 has an opening, and the pulp container 20 is located at the inner bottom of the frame 10. A U-shaped overflow plate 204 is disposed in the pulp container 20, and the U-shaped overflow plate 204 divides the interior of the pulp container 20 into a pulp cavity and a U-shaped overflow cavity to prevent the pulp after pulp suction from overflowing to the ground, and the U-shaped overflow cavity is connected to a collection tank through a return pipe.

The pulp suction mold enters into the pulp cavity to suck pulp.

A discharge port is disposed at the bottom of the pulp container 20, to facilitate the use of pulps with different formulas.

Figure 2:
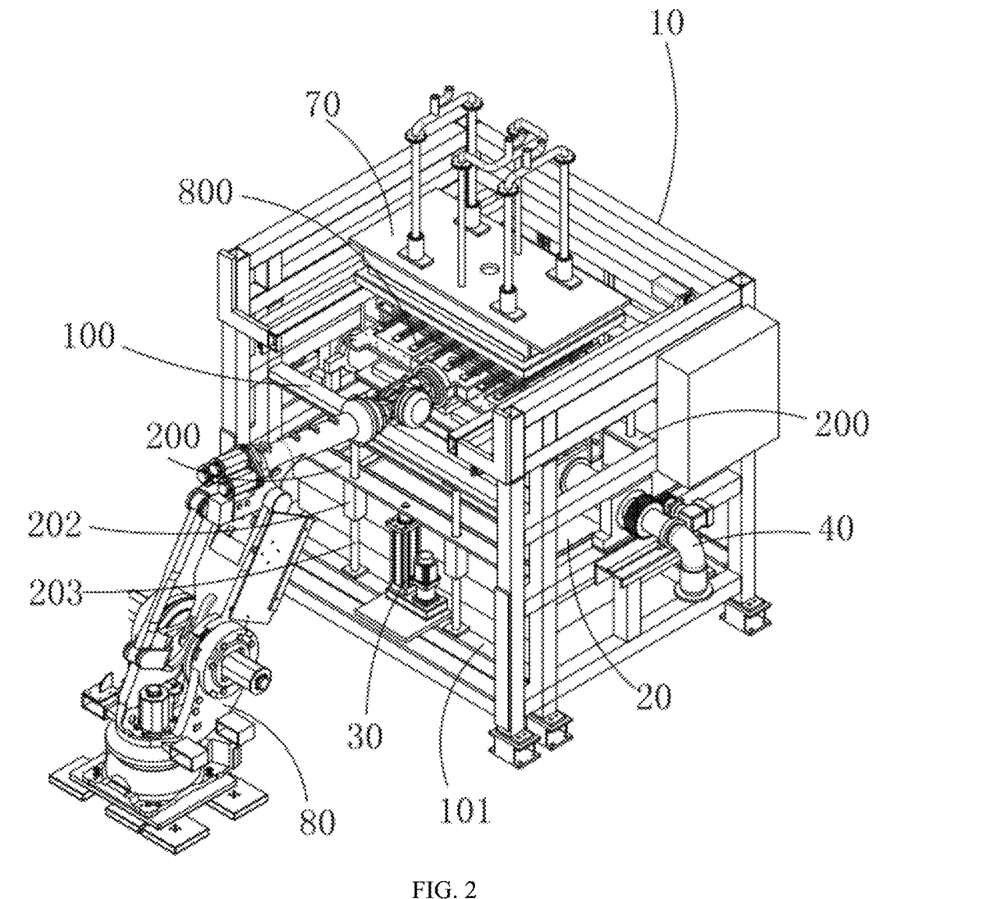
FIG. 2 illustrates a schematic perspective structural view of the rotating pulp suction and robot transfer molding machine according to the present disclosure.
Figure 3:
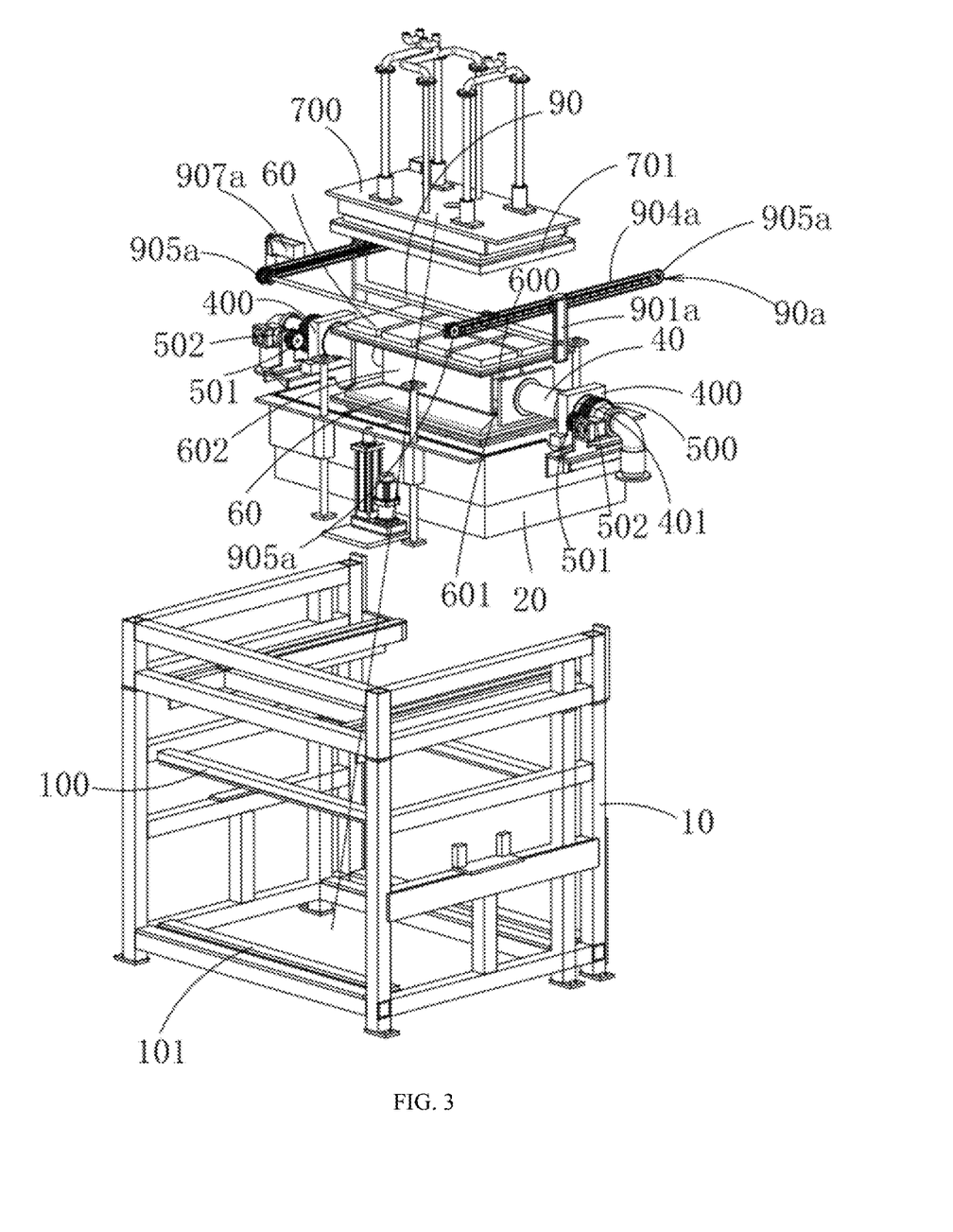
FIG. 3 illustrates a schematic exploded structural view of the rotating pulp suction and robot transfer molding machine according to the present disclosure.

As illustrated in FIG. 2 and FIG. 3, a pulp container drive mechanism 30 is provided. The pulp container 20 and the frame 10 are slidably connected vertically. The vertically slidable connection can ensure the lifting stability of the pulp container 20 and realize the purpose of preventing the pulp inside the pulp container 20 from shaking and spilling.

The above purpose can be achieved by the following structure.

Specifically, rear and front sides of the opening on the pulp container 20 are disposed with cantilever plates 200. The pulp container 20 and the cantilever plates 200 are connected by welding. Two ends of each of the cantilever plate 200 are respectively defined with guide post penetration holes 201. A lower opening of each of the guide post penetration holes 201 is disposed with a guide post sleeve 202. The guide post sleeve 202 and the cantilever plate 200 are connected by welding. The frame 10 is provided with upper fixing beams 100 located above the cantilever plates 200 respectively, and further provided with lower fixing beams 101 located below the cantilever plates 200 respectively. The upper fixing beam 100 and the lower fixing beam 101 at the front side of the frame 10 are parallel to each other up and down. The upper fixing beam 100 and the lower fixing beam 101 at the rear side of the frame 10 are parallel to each other up and down. Each the guide post sleeve 202 is inserted a guide post 203 therein, and an upper end of the guide post 203 penetrates through the guide post penetration hole 201 upwards. The upper end of the guide post 203 penetrating through the cantilever plate 200 on the front side of the pulp container 20 is fixed onto the upper fixing beam 100 at the front side of the frame 10, and a lower end of the guide post 203 penetrating through the cantilever plate 200 on the front side of the pulp container 20 is fixed onto the lower fixing beam 101 at the front side of the frame 10. The upper end of the guide post 203 penetrating through the cantilever plate 200 on the rear side of the pulp container 20 is fixed onto the upper fixing beam 100 at the rear side of the frame 10, and a lower end of the guide post 203 penetrating through the cantilever plate 200 on the rear side of the pulp container 20 is fixed onto the lower fixing beam 101 at the rear side of the frame 10.

The pulp container drive mechanism 30 is connected to the pulp container 20 and configured (i.e., structured and arranged) to drive the pulp container 20 to move up and down in a vertical direction. In a preferred embodiment, the pulp container drive mechanism 30 includes a front driving mechanism and a rear driving mechanism. The front driving mechanism is arranged between two guide posts 203 at the front side of the frame 10, and the rear driving mechanism is arranged between two guide posts 203 at the rear side of the frame 10. A structure of the front driving mechanism is the same as that of the rear driving mechanism and includes a fixing base plate 300. A part of the fixing base plate 300 is fixed onto a bottom beam of the frame 10, e.g., fixed by a screw bolt, and the other part of the fixing base plate 300 is fixed onto the lower fixing beam 101, e.g., fixed by a screw bolt. A pulp container driver 301 is mounted onto an upper surface of the fixing base plate 300. The pulp container driver 301 may be any one of a pneumatic cylinder, an oil cylinder and a servo motor. The pulp container driver 301 is connected to the cantilever plate 200. A servo motor is connected to a vertically disposed screw rod through a belt transmission structure. A thread sleeve for threadedly connecting with the screw rod is disposed on the cantilever plate 200. The thread sleeve is rotatably connected with the cantilever plate 200. The fixing base plate 300 is provided thereon a protective barrel-shaped part sleeved on outside of the screw rod, a top portion of the protective barrel-shaped part is provided with a transverse barrel, the belt transmission structure is located in the transverse barrel, and the servo motor is fixed on a lower surface of one end of the transverse barrel facing away from the protective barrel-shaped part.

As illustrated in FIGS. 1-4 and FIG. 6, a pulp suction vacuum pipeline 40 is provided. The pulp suction vacuum pipeline 40 is horizontally arranged. Two ends of the pulp suction vacuum pipeline 40 are rotatably connected to the frame 10. In order to ensure the stability of rotation, the pulp suction vacuum pipeline 40 is U-shaped and transversely arranged above the opening of the pulp container 20. Two ends of a middle straight section of the pulp suction vacuum pipeline 40 are respectively sleeved with turnover seats 400 rotatably connected with the pulp suction vacuum pipeline 40. The turnover seats 400 are fixed on the frame 10. A bearing or a shaft sleeve is disposed between each of the turnover seats 400 and the pulp suction vacuum pipeline 40. Any one end of the middle straight section of the pulp suction vacuum pipeline 40 and the frame 10 is disposed an angle limit mechanism therebetween for limiting a rotation angle of the pulp suction vacuum pipeline 40.

Figure 7:
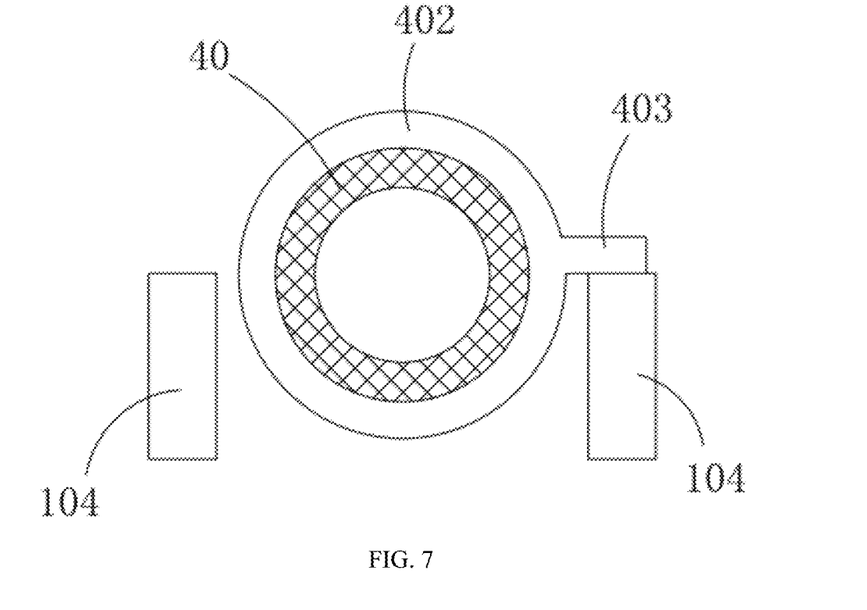
FIG. 7 illustrates a schematic structural view of an angle limiting mechanism of the rotating pulp suction and robot transfer molding machine according to the present disclosure.

As illustrated in FIG. 4 and FIG. 7, the angle limit mechanism includes a fixing ring 402 sleeved on any one end of the middle straight section of the pulp suction vacuum pipeline. The pulp suction vacuum pipeline 40 and the fixing ring 402 are circumferentially fixedly connected with each other, and the circumferential fixed connection of them can be implemented by several radial locking screws or by welding. An outer wall of the fixing ring 402 is disposed with a limit arm 403. Two limit posts 104 are provided on the frame 10, and each of the two limit posts 104 is located on a circumferential outer side of the corresponding fixing ring 402. The two limit posts 104 are mutually parallel. The pulp suction vacuum pipeline 40 rotates into place if the limit arm 403 contacts an upper surface of any one of the limit posts 104.

As illustrated in FIG. 3, the pulp suction vacuum pipeline 40 is located above the opening of the pulp container 20 and connected with a rotation drive mechanism 50. The rotation drive mechanism 50 includes driven gears 500, driving gears 501, and servo motors 502. The driven gears 500 are respectively sleeved on the two ends of the middle straight section of the pulp suction vacuum pipeline 40. Each of the driven gears 500 is located outside of the corresponding turnover seat 400. The driving gears 501 are disposed on the frame 10 and meshed with the driven gears 500 in one-to-one manner. The servo motors 502 are configured to drive the respective driving gears 501 to rotate. Each of the driven gears 500 is rotatably arranged on a cantilever plate at a side of the frame 10.

Figure 6:
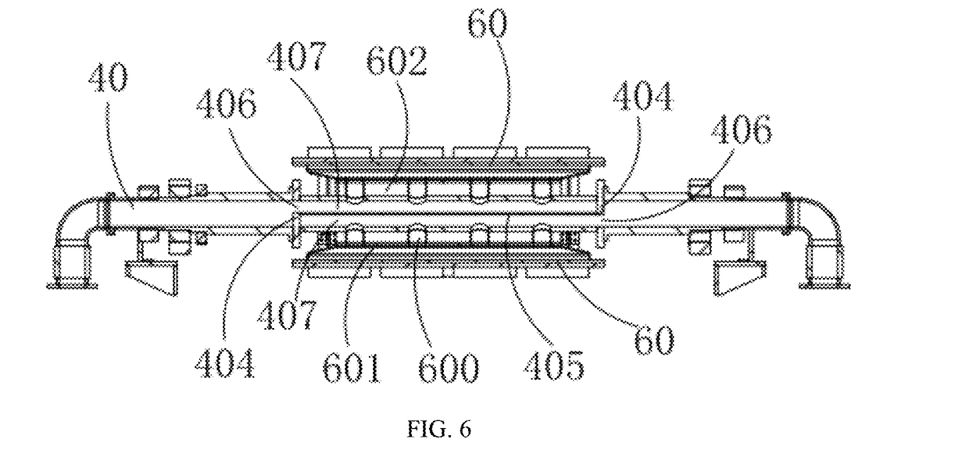
FIG. 6 illustrates a schematic view of a vacuumizing connecting structure of the rotating pulp suction and robot transfer molding machine according to the present disclosure.

As illustrated in FIG. 3 and FIG. 6, at least one pulp suction mold 60 is fixed onto the middle of the pulp suction vacuum pipeline 40. The pulp suction vacuum pipeline 40 and the at least one pulp suction molds 60 are connected through a vacuumizing connecting structure. After the pulp container 20 is lifted up to a setting position, the pulp suction mold 60 enters into the pulp container 20 to suck the pulp under the rotation of the pulp suction vacuum pipeline 40, and then leaves the pulp container 20 along with the rotation of the pulp suction vacuum pipeline 40.

The pulp suction mold 60 is located at a middle position inside the pulp container 20 when sucking the pulp in the pulp container 20. When the pulp suction mold 60 is under a low-pressure cleaning and a high-pressure cleaning, cleaning water downwardly flows into the pulp container 20, to avoid contamination of the ground environment by the cleaning water.

The at least one pulp suction mold 60 in the illustrated embodiment may be 1-8 in quantity, and when the number of the at least one pulp suction mold 60 is two, one of the pulp suction molds 60 enters into the pulp container 20 to suck the pulp while the other one of the pulp suction molds 60 is mated/engaged with an extrusion mechanism 70.

As a preferred embodiment, the at least one pulp suction mold 60 is two in quantity, and the two pulp suction molds 60 are symmetrically distributed about an axial line of the pulp suction vacuum pipeline 40.

Moreover, the vacuumizing connecting structure may include partition plates 404 and an intermediate partition 405. The partition plates 404 are arranged in the two ends of the straight section of the pulp suction vacuum pipeline 40 respectively. Each of the partition plates 404 is defined with a connecting hole 406, and the two connecting holes 406 of the respective partition plates 404 are arranged in staggered manner. Two ends of the intermediate partition 405 are connected to opposing inner surfaces of the two partition plates 404. Two lengthwise sides of the intermediate partition 405 is sealingly connected to an inner wall of the pulp suction vacuum pipeline 40. The partition plates 404 and the intermediate partition 405 cooperatively define two independent cavities inside the pulp suction vacuum pipeline 40. One end of the pulp suction vacuum pipeline 40 is connected with one of the cavities, and the other end of the pulp suction vacuum pipeline 40 is connected with the other one of the cavities. Each pulp suction mold 60 is connected a corresponding one of the cavities through several connecting ducts 600. The connecting tubes 600 are rigid ducts, such as metal ducts or plastic ducts. One end of the connecting duct 600 is connected to the pulp suction mold 60, and the other end of the connecting duct 600 is connected to the pulp suction vacuum pipeline 40.

The pulp suction vacuum pipeline 40 includes an intermediate pipe, and bending pipes each with a L-shaped end. The partition plates 404 are arranged on two ends of the intermediate pipe respectively. Each of the bending pipes with the L-shaped end is connected to the end of the corresponding partition plate 404 facing away from the intermediate pipe. The intermediate pipe and the partition plates 404 are connected by welding. The partition plates 404 and the respective bending pipes with the L-shaped end are connected through flanges together with screw bolts.

An end surface of an end of the partition plate 404 facing away from the intermediate pipe is provided with a ring-shaped step, the flange is fixed onto the bending pipe with L-shaped end and positioned in the ring-shaped step, and meanwhile the ring-shaped step is defined with several threaded holes, and the screw blots pass through the flange and threadedly connected to the threaded holes.

Each of the connecting holes 406 is a semicircular hole, an arc-shaped hole wall of the connecting hole 406 is flush with a pipe wall of the intermediate pipe, one surface of the intermediate partition 405 is flush with a straight hole wall of one of the connecting holes 406, the other surface of the intermediate partition 405 is flush with a straight hole wall of the other connecting hole 406, and such a design can avoid interference.

A surface of each the pulp suction mold 60 close to the connecting ducts 600 is disposed with a reinforcing plate 601, and through holes allowing the connecting ducts 600 to penetrate therethrough one-to-one are disposed on the reinforcing plate 601. The two reinforcing plates 601 respectively disposed on the pulp suction molds 60 are parallel to each other. Opposing sides of the two reinforcing plates 601 are connected to side reinforcement plates 602. The reinforcing plate 601 and the side reinforcement plates 602 together form a rectangular structure.

The reinforcing plate 601 and the side reinforcement plates 602 are connected by welding or by screw bolts, and such structure can improve the stability of fixing the pulp suction mold and avoid the phenomenon of breakage.

Figure 9:
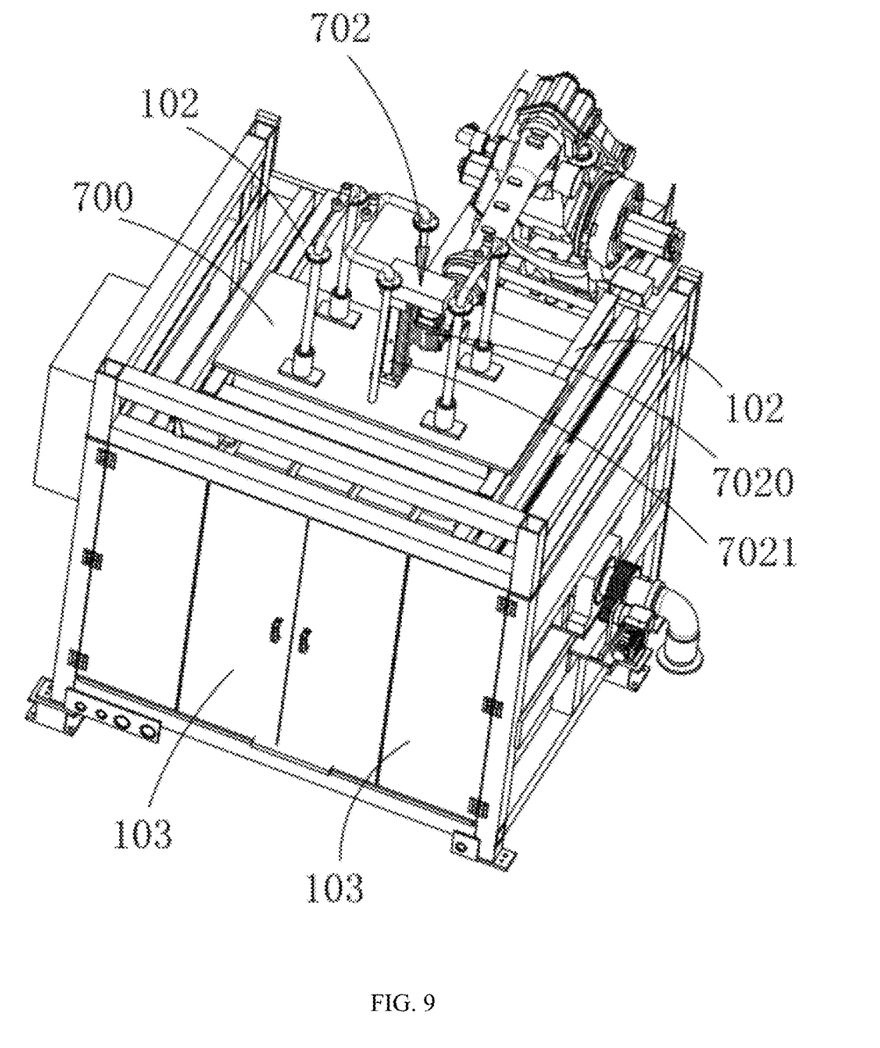
FIG. 9 illustrates a schematic rear perspective structural view of the rotating pulp suction and robot transfer molding machine according to the present disclosure.

As illustrated in FIG. 1, FIG. 3 and FIG. 9, the extrusion mechanism 70 is arranged above the pulp suction vacuum pipeline 40, and when the pulp suction mold 60 after leaving the pulp container 20 is rotated to just below of the extrusion mechanism 70, the extrusion mechanism 70 downwardly engages with the pulp suction mold 60 to extrude the pulp on the pulp suction mold 60 and thereby a wet blank of pulp product is prepared on the pulp suction mold 60. The extrusion mechanism 70 may include a fixing plate 700 fixed on a top portion of the frame 10. A lower surface of the fixing plate 700 is connected with an extrusion mold 701, and the extrusion mold 701 is vertically slidably connected to the fixing plate 700. An extrusion lifting drive device 702 is disposed on the fixing plate 700 and connected to the extrusion mold 701. The extrusion lifting drive device 702 may be a pneumatic or an oil cylinder, or may be a first servo motor 7020. The first servo motor 7020 is connected to a vertically arranged first screw rod through a belt transmission structure. A first thread sleeve is disposed on the extrusion mold 701 and threadedly connected to the first screw rod. The first thread sleeve is rotatably connected to the extrusion mold 701. A first protective barrel-shaped part 7021 is disposed on the fixing plate 700 and sleeved on outside of the first screw rod. A transverse barrel is disposed on a top portion of the first protective barrel-shaped part 7021, and the belt transmission structure is located in the transverse barrel. The first servo motor 7020 is fixed on a lower surface of an end of the transverse barrel facing away from the first protective barrel-shaped part 7021. A heating structure is disposed in the extrusion mold 701, and the heating structure may employ an electric heating manner or a steam heating manner, and can be any one of the two kinds of heating manners. The extrusion mold 701, under the driving of the extrusion lifting drive device 701, downwardly moves close to the pulp suction mold 60 rotated to just below the extrusion mold 701.

The pulp suction mold 60 and the extrusion mold 701 are mutually engaged with each other.

The heating structure may be activated or may not be activated, which is determined according to actual requirements. The employment of the heating structure can heat the wet blank of pulp product to shorten a hot-press molding time.

Two adjustment beams 102 are disposed at the top of the frame 10 and respectively arranged below transverse two ends of the fixing plate 700. Lower surfaces of the transverse two ends of the fixing plate 700 are provided with slide block seats slidably connected to the adjustment beams 102 in one-to-one manner. An adjustment locking structure is arranged between the slide block seat and the adjustment beam 102. The adjustment locking structure may be a structure with several screw holes and one screw, and a position is locked by inserting the screw into any one of the screw holes.

The above structure can realize adjustments of front and rear positions of the fixing plate 700, that is, realize the adjustment of mounting position of the extrusion mold 701.

For a robot 80, a transfer mold 800 is mounted on the robot 80. The robot 80 drives the transfer mold 800 to take the wet blank of pulp product and transfer the taken wet blank of pulp product to outside of the frame 10. The robot 80 and the transfer mold 800 both are prior art, and thus their structures will not be further described in the present disclosure.

Figure 5:
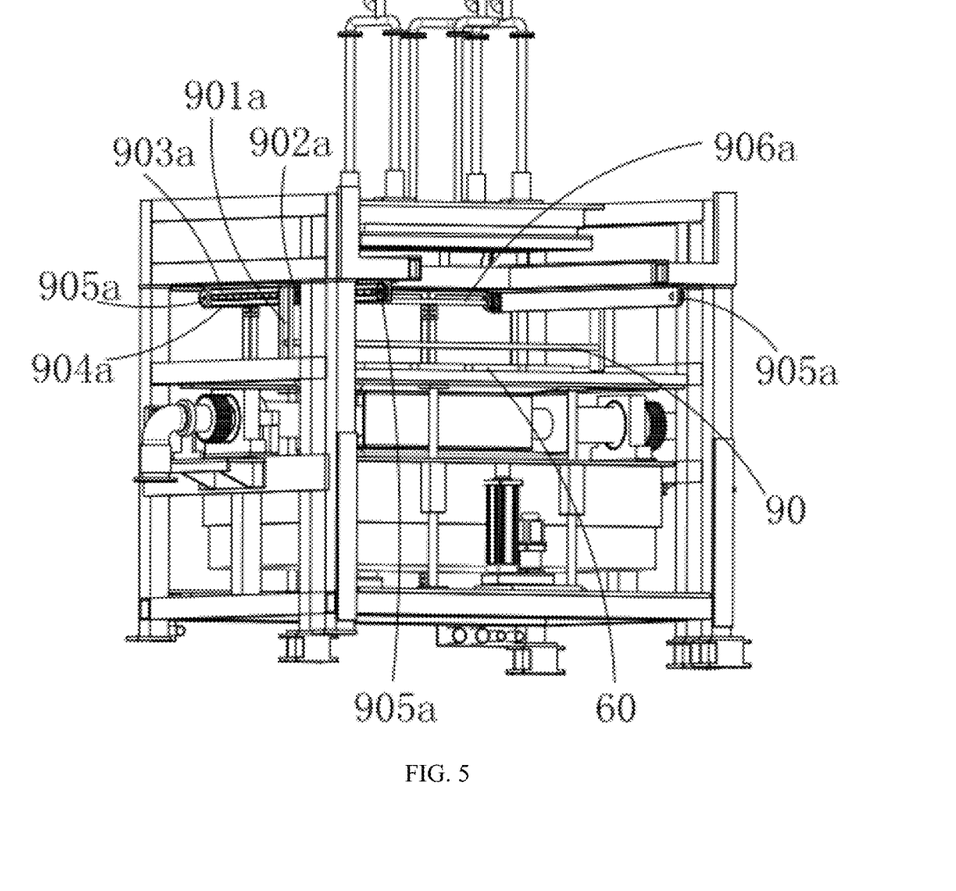
FIG. 5 illustrates a schematic perspective structural view of the rotating pulp suction and robot transfer molding machine after removing a robot according to the present disclosure.

As illustrated in FIG. 5, a high-low pressure sprinkler pipe 90 is horizontally slidably connected to the frame in a front-rear direction, and transversely arranged above the pulp suction vacuum pipeline 40. High-pressure nozzles and low-pressure nozzles with downward water outlets are disposed on the high-low pressure sprinkler pipe 90. The low-pressure nozzle is an atomization nozzle, a low-pressure cleaning of the atomization nozzle is an atomization cleaning, which can achieve advantages of no burr, no cutting edge and smooth surface of pulp products, etc. The high-low pressure sprinkler pipe 90 is connected to the sprinkler pipe drive mechanism 90a. The high-low pressure sprinkler pipe 90 can move above the pulp suction mold 60 under the driving of the sprinkler pipe drive mechanism 90a and carry out a low-pressure sprinkling cleaning on the pulp through the low-pressure nozzles, and after the wet blank of pulp product is transferred through the transfer mold 800, the high-low pressure sprinkler pipe 90 is moved above the pulp suction mold 60 and carries out a high-pressure sprinkling cleaning on the pulp suction mold 60.

The sprinkler pipe drive mechanism 90a may include vertical plates 901a connected to two ends of the high-low pressure sprinkler pipe 90 respectively. An upper end of each of the vertical plates 901a is connected with a slider 902a. The sliders 902a connected with the respective vertical plates 901a are respectively slidably connected to guide rails 903a fixed at the top of the frame 10. The two guide rails 903a are mutually parallel. A pulley belt 904 is disposed on the frame 10 and around the corresponding one of the guide rails 903a. The pulley belt 904a is wound around two pulleys 905a. The upper end of each vertical plate 901a is connected to the pulley belt 904a through a clamping structure. Two ends of each of the guide rails 903a are provided with the pulleys 905a respectively. One pulley 905a for one pulley belt is connected to one pulley 905a for the other one pulley belt through a linkage shaft. The linkage shaft 906a is connected to a servo driving motor 907a through a chain transmission structure.

During sprinkling cleaning, the servo driving motor 907a is activated and drives the sliders 902a to move along the respective guide rails 903a in the front-rear direction of the frame 10 through the respective pulley belts 904a, and during the movement in the front-rear direction, the high-pressure nozzles or the low-pressure nozzles carry out sprinkler cleaning operations.

The clamping structure may include a lower clamp plate fixed on the top of the vertical plate 901a, and an upper clamp plate disposed above the lower clamp plate. The upper clamp plate and the lower clamp plate are mutually parallel. An upper surface of the lower clamp plate is provided with clamping teeth engaged with teeth of the pulley belt 904a, and the pulley belt 904a passes through a gap between the upper clamp plate and the lower clamp plate and is meshed with the pulley belt 904a through the clamping teeth.

In addition, the high-low pressure sprinkler pipe 90 may include a high-pressure outlet pipe and a low-pressure outlet pipe. There are several high-pressure nozzles sequentially connected to the high-pressure outlet pipe at intervals. There are several low-pressure nozzles sequentially connected to the low-pressure outlet pipe at intervals. The high-pressure nozzles and low-pressure nozzles are aligned with each other or staggeredly distributed.

A low-pressure sprinkler pressure is 0.2-0.3 MPa, and a high-pressure sprinkler pressure is 0.8-1.0 MPa.

A working principle of the illustrated embodiment is as follows.

S1, mixing pulp materials to obtain pulp, injecting the pulp into the pulp container 20, and evenly stirring and mixing;

S2, lifting up the pulp container 20 to a setting position, rotating the pulp suction vacuum pipeline 40 to drive one pulp suction mold 60 to immerse into the pulp in the pulp container, and then connecting the pulp suction vacuum pipeline 40 to a vacuum pump for vacuumizing; at this time, the pulp in the pulp container is sucked onto the pulp suction mold 60 due to the pulp suction mold 60 is vacuumized, maintaining at a vacuum state and rotating the pulp suction vacuum pipeline 40 to rotate the pulp suction mold sucked with the pulp to just below the extrusion mechanism 70 while at least one other pulp suction mold being immersed into the pulp container to suck the pulp;

S3, carrying out lower-pressure cleaning, by the low-pressure nozzles, on the pulp sucked on the pulp suction mold;

S4, the at least one other pulp suction mold sucking the pulp, and the extrusion mechanism 70 simultaneously dropping downwardly and engaging with the pulp suction mold 60 for extrusion to prepare a wet blank of pulp product;

S5, pre-drying the wet blank of pulp product by heating through the extrusion mechanism 70, a dried moisture is within 15% of a total moisture;

S6, driving the transfer mold 800 by the robot 80 to take the pre-dried wet blank of pulp product and transferring the taken pre-dried wet blank of pulp product to outside of the frame;

S7, carrying out high-pressure cleaning on the pulp suction mold by the high-pressure nozzles, and repeating the above steps S1-S7 for the cleaned suction mold.

In the above step S2, the setting position to which the pulp container 20 is lifted up is a fixed setting position; or, each time the pulp suction mold is immersed into the pulp container, it is lifted up to a setting position of each time.

The concrete embodiments of the present disclosure described herein are merely illustrative of the spirit of the present disclosure. Those skilled in the art can make various modifications or additions, or substitutions in a similar manner to the described concrete embodiments, without departing from the spirit of the present disclosure or going beyond the scope defined in the appended claims.

What is claimed is:

1. A molding machine, comprising:
   a frame (10);
   a pulp container (20), wherein an upper end of the pulp container (20) is defined with an opening, and the pulp container (20) is arranged at an inner bottom of the frame (10);
   a pulp container drive mechanism (30), wherein the pulp container (20) and the frame (10) are vertically slidably connected, and the pulp container drive mechanism (30) is connected to the pulp container (20) and configured to drive pulp container (20) to move up and down in a vertical direction;
   a pulp suction vacuum pipeline (40), arranged horizontally, wherein two ends of the pulp suction vacuum pipeline (40) are rotatably connected to the frame (10), and the pulp suction vacuum pipeline (40) is located above the opening of the pulp container (20) and connected to a rotation drive mechanism (50);
   a pulp suction mold (60), fixed on a middle of the pulp suction vacuum pipeline (40), wherein the pulp suction vacuum pipeline (40) and the pulp suction mold (60) are connected through a vacuumizing connecting structure, and the pulp suction mold (60) is configured to, after the pulp container (20) is lifted up to a setting position, enter into the pulp container (20) to suck pulp under a rotation of the pulp suction vacuum pipeline (40) and leave the pulp container (20) along with the rotation of the pulp suction vacuum pipeline (40);
   an extrusion mechanism (70), arranged above the pulp suction vacuum pipeline (40) and configured to, when the pulp suction mold (60) after leaving the pulp container (20) is rotated to just below the extrusion mechanism (70), downwardly engage with the pulp suction mold (60) and extrude the pulp on the pulp suction mold (60) to prepare a wet blank of pulp product; and
   a high-low pressure sprinkler pipe (90), horizontally slidably connected to the frame in a front-rear direction and transversely arranged above the pulp suction vacuum pipeline (40), wherein high-pressure nozzles and low-pressure nozzles with downward outlets are disposed on the high-low pressure sprinkler pipe (90), the high-low pressure sprinkler pipe (90) is connected to a sprinkler pipe drive mechanism (90a); the high-low pressure sprinkler pipe (90) is configured to, under a driving of the sprinkler pipe drive mechanism (90a), move above the pulp suction mold (60) and perform low-pressure sprinkling cleaning to the pulp by the low-pressure nozzles; and the high-low pressure sprinkler pipe (90) is configured to, after the wet blank of pulp product is transferred through a transfer mold, move above the pulp suction mold (60) and perform high-pressure sprinkling cleaning on the pulp suction mold (60) through the high-pressure nozzles.

2. The molding machine according to claim 1, wherein the pulp suction mold (60) is 1-8 in quantity; and when the quantity of the pulp suction mold (60) is at least two, one of the at least two pulp suction molds (60) enters into the pulp container to suck the pulp, while the other one of the at least two pulp suction molds (60) is engaged with the extrusion mechanism (70).

3. The molding machine according to claim 1, wherein cantilever plates (200) are respectively disposed on front and rear sides of the opening of the pulp container (20), two ends of each of the cantilever plates (200) are respectively disposed with guide post penetration holes (201), guide post sleeves (202) are connected at lower openings of the guide post penetration holes (201), upper fixing beams (100) are disposed on the frame (10) and respectively located above the cantilever plates (200), lower fixing beams (101) are disposed on the frame (10) and respectively located below the cantilever plates (200), the upper fixing beam (100) and the lower fixing beam (101) located at a front side of the frame (10) are arranged mutually parallel up and down, the upper fixing beam (100) and the lower fixing beam (101) located at a rear side of the frame (10) are arranged mutually parallel up and down, guide posts (203) are respectively inserted in the guide post sleeves (202), upper ends of the guide posts (203) penetrate through the respective guide post penetration holes (201) upwards, the upper end of the guide post (203) penetrating through the cantilever plate (200) on a front side of the pulp container (20) is fixed on the upper fixing beam (100) at the front side of the frame (10), a lower end of the guide post (203) penetrating through the cantilever plate (200) on the front side of the pulp container (20) is fixed on the lower fixing beam (101) at the front side of the frame (10), the upper end of the guide post (203) penetrating through the cantilever plate (200) on a rear side of the pulp container (20) is fixed on the upper fixing beam (100) at the rear side of the frame (10), a lower end of the guide post (203) penetrating through the cantilever plate (200) on the rear side of the pulp container (20) is fixed on the lower fixing beam (101) at the rear side of the frame (10).

4. The molding machine according to claim 3, wherein the pulp container drive mechanism (30) comprises a front driving mechanism and a rear driving mechanism; the front driving mechanism is arranged between two of the guide posts (203) located at the front side of the frame (10), the rear driving mechanism is arranged between two of the guide posts (203) located at the rear side of the frame (10), a structure of the front driving mechanism is the same as that of the rear driving mechanism and comprises a fixing base plate (300) and a pulp container driver (301); a part of the fixing base plate (300) is fixed on a bottom beam of the frame (10), and the other part of the fixing base plate (300) is fixed on the lower fixing beam (101); the pulp container driver (301) is mounted on an upper surface of the fixing base plate (300), and the pulp container drive (301) is one of a pneumatic cylinder, an oil cylinder and a servo motor; and the pulp container driver (301) is connected to the cantilever plate (200).

5. The molding machine according to claim 1, wherein the pulp suction vacuum pipeline (40) is U-shaped and transversely arranged above the opening of the pulp container (20), two ends of a middle straight section of the pulp suction vacuum pipeline (40) are respectively sleeved with turnover seats (400) rotatably connected to the pulp suction vacuum pipeline (40), the turnover seats (400) are fixed on the frame (10), the pulp suction vacuum pipeline (40) and each of the turnover seats (400) have a bearing (401) or a shaft sleeve arranged therebetween.

6. The molding machine according to claim 5, wherein the rotation drive mechanism (50) comprises driven gears (500), driving gears (501), and servo motors (502); the driven gears (500) are respectively sleeved on the two ends of the middle straight section of the pulp suction vacuum pipeline (40), and each of the driven gears (500) is located an outer side of a corresponding one of the turnover seats (400); the driving gears (501) are disposed on the frame (10) and meshed with the driven gears (500) in one-to-one manner, and the servo motors (502) are configured to respectively drive the driving gears (501) to rotate.

7. The molding machine according to claim 2, wherein the pulp suction mold (60) is two in quantity, and the two pulp suction molds (60) are symmetrically distributed about an axial line of the pulp suction vacuum pipeline (40); the vacuumizing connecting structure comprises partition plates (404) and an intermediate partition (405); the partition plates (404) are respectively arranged at two inner ends of the middle straight section of the pulp suction vacuum pipeline (40), the partition plates (404) are respectively defined with connecting holes (406) and the connecting holes (406) are staggeredly distributed, two ends of the intermediate partition are respectively connected to opposing inner surfaces of the partition plates (404), the partition plates (404) and the intermediate partition (405) together divide an interior of the pulp suction vacuum pipeline (40) into two independent cavities (407), one end of the pulp suction vacuum pipeline (40) is connected with one of the cavities (407), the other end of the pulp suction vacuum pipeline (40) is connected with the other one of the cavities (407), each the pulp suction mold (60) is connected with a corresponding one of the cavities (407) through a plurality of connecting ducts (600), each of the connecting ducts (600) is a rigid pipe, one end of the connecting duct (600) is connected to the pulp suction mold and the other end of the connecting duct (600) is connected onto the pulp suction vacuum pipeline (40), and an angle limit mechanism is disposed between the frame (10) and any one of the ends of the middle straight section of the pulp suction vacuum pipeline (40) and configured to limit a rotation angle of the pulp suction vacuum pipeline (40).

8. The molding machine according to claim 7, wherein a surface of each of the two pulp suction molds (60) close to the connecting ducts (600) is disposed with a reinforcing plate (601), and the reinforcing plate (601) is defined with through holes allowing the connecting ducts (600) to pass therethrough; the two reinforcing plates (601) respectively corresponding to the two pulp suction molds (60) are mutually parallel, and opposing sides of the two reinforcing plates (601) are connected with side reinforcement plates (602); and the reinforcing plate (601) and corresponding ones of the side reinforcement plates (602) together form a rectangular structure.

9. The molding machine according to claim 1, wherein the extrusion mechanism (70) comprises a fixing plate (700) fixed at a top of the frame (10), an extrusion mold (701) is connected to a lower surface of the fixing plate (700) and vertically slidably connected with the fixing plate (700), an extrusion lifting drive device is disposed on the fixing plate (700) and connected to the extrusion mold (701), a heating structure is disposed in the extrusion mold (701), and the extrusion mold (701) is configured to, under a driving of the extrusion lifting drive device, move downwardly close to the pulp suction mold rotated to just below of the extrusion mold (701).

10. The molding machine according to claim 1, wherein the sprinkler pipe drive mechanism (90a) comprises vertical plates (901a) are respectively connected to two ends of the high-low pressure sprinkler pipe (90), upper ends of the respective vertical plates (901a) are connected to sliders (902a) respectively, the sliders (902a) are respectively slidably connected with guide rails (903a) fixed at a top of the frame (10), the guide rails are mutually parallel, pulley belts (904a) are disposed on the frame (10) and around outsides of the guide rails (903a) respectively, each of the pulley belts is wound around two pulleys (905a), an upper end of each of the vertical plates (901a) is connected to the pulley belt (904a) through a clamping structure, two ends of each of the guide rails (903a) are respectively disposed with the pulleys (905a), one the pulley (905a) which one of the pulley belts is wound around is connected to one the pulley (905a) which the other one of the pulley belts is wound around through a linkage shaft (906a), and the linkage shaft (906a) is connected to a servo driving motor (907a) through a chain transmission structure.

11. The molding machine according to claim 1, further comprising a robot (80); wherein a transfer mold (800) is mounted on the robot (80), and the robot (80) is configured to drive the transfer mold (800) to take the wet blank of pulp product and transfer the taken wet blank of pulp product to outside of the frame (10).

12. A rotating pulp suction molding method for pulp products, using the molding machine according to claim 1, wherein the molding method comprises:
- S1, mixing pulp materials to obtain pulp, injecting the pulp into the pulp container, and evenly stirring and mixing;
- S2, lifting up the pulp container to a setting position, rotating the pulp suction vacuum pipeline to drive one the pulp suction mold to immerse into the pulp in the pulp container, connecting the pulp suction vacuum pipeline to a vacuum pump and vacuumizing, at this time the pulp in the pulp container being sucked onto the pulp suction mold due to the pulp suction mold is vacuumized, maintaining at a vacuum state and rotating the pulp suction vacuum pipeline to rotate the pulp suction mold sucked with the pulp to just below the extrusion mechanism, and at least one other pulp suction mold being immersed into the pulp container to suck the pulp;
- S3, performing low-pressure cleaning, by the low-pressure nozzles, to the pulp sucked on the pulp suction mold;
- S4, simultaneously dropping the extrusion mechanism downwardly to engage with the pulp suction mold for extrusion to prepare a wet blank of pulp product while the at least one other pulp suction mold sucking the pulp;
- S5, pre-drying the wet blank of pulp product by heating through the extrusion mechanism;
- S6, driving a transfer mold to take the pre-dried wet blank of pulp product and transferring the taken pre-dried wet blank of pulp product to outside of the frame, by a robot; and
- S7, performing high-pressure cleaning on the pulp suction mold by the high-pressure nozzles, and repeating the steps S1~S7 for the cleaned pulp suction mold.

* * * * *